United States Patent [19]

Jaspers et al.

[11] Patent Number: 5,360,681
[45] Date of Patent: Nov. 1, 1994

[54] SEALS FOR GAS-CARRYING LINES AND INSTALLATIONS WHICH COMPRISE SUCH SEALS

[75] Inventors: Blandikus C. Jaspers; Bernardus A. M. Van Dongen, both of Delft, Netherlands

[73] Assignee: Seed Capital Investments (SCI) B.V., Ga Utrecht, Netherlands

[21] Appl. No.: 39,103

[22] PCT Filed: Oct. 2, 1991

[86] PCT No.: PCT/NL91/00187

§ 371 Date: Apr. 1, 1993

§ 102(e) Date: Apr. 1, 1993

[87] PCT Pub. No.: WO92/06517

PCT Pub. Date: Apr. 16, 1992

[30] Foreign Application Priority Data

Oct. 5, 1990 [NL] Netherlands .................. 9002169

[51] Int. Cl.$^5$ ............................................. H01M 8/04
[52] U.S. Cl. ....................................... 429/34; 429/33; 429/35; 429/36
[58] Field of Search .................. 429/33, 34, 35, 36

[56] References Cited

U.S. PATENT DOCUMENTS 4,770,955 10/1988 Ruhl ..................................... 429/33
4,910,100 3/1990 Nakanishi et al. ..................... 429/30

FOREIGN PATENT DOCUMENTS 0355420 2/1990 European Pat. Off. .
4004271 8/1990 Germany .

OTHER PUBLICATIONS

C. L. Babcock, "Silicate Glass Technology Methods", pp. 222–225, John Wiley and Sons, 1977 (month N/A).
G. W. Morey, "The Properties of Glass", pp. 296–297, Reinhold Publishing Company, 1938 (month N/A).

*Primary Examiner*—Prince Willis, Jr.
*Assistant Examiner*—M. Nuzzolillo
*Attorney, Agent, or Firm*—Bachman & LaPointe

[57] ABSTRACT

Seal for gas carrying lines, of an inorganic material of a yield stress and viscosity at the operating temperature that are sufficiently high to counteract leakage of the glass through the opening as a consequence of its own weight and the pressure gradient and fitted between at least two parts which must be able to move relative to one another characterized in that the seal is constructed to permit a movement in axial direction.

9 Claims, 1 Drawing Sheet

SEALS FOR GAS-CARRYING LINES AND INSTALLATIONS WHICH COMPRISE SUCH SEALS

BACKGROUND OF THE INVENTION

The invention relates to a seal provided between gas-carrying lines and a longitudinal member. More particular the invention relates to a seal for gas-carrying lines of an inorganic material of a yield stress and viscosity at the operating temperature that are sufficiently high to counteract leakage of the glass through the opening as a consequence of its own weight and the pressure gradient and fitted between at least two parts which must be able to move relative to one another and to installations which comprise such seals. The invention relates in particular to seals for applications in electrochemical cells and to electrochemical cells which comprise such seals.

EP-A-0,355,420 discloses a fuel cell incorporating gas-sealing soda lime glass O-rings between members of the cell stack, these permitting the individual members of the fuel cell stack to freely slide with respect to one another during thermal expansion and contraction. The sealing can be obtained by glass O-rings, which are fitted in glass reservoirs. The O-rings are formed of a soda lime glass having a melting point of 900° C. and a working temperature of 1,000° C.

During use of the cell stack according to EP-A-0,355,420 the clearance between several parts to be sealed relative to each other is removed and they are positioned directly on each other wherein the sealing material engages between the sealing faces.

It is not possible in this way to provide a seal which can accommodate axial movement of the part relative to a member at high temperature i.e., a seal which allows for a relatively large displacement between the part and the member.

SUMMARY OF THE INVENTION

The invention aims to provide a seal which can be used between a pipe and a member.

According to the invention this is realized with the seal provided between gas-carrying lines and a longitudinal member, having an axial axis along its length, said lines being introduced in an opening in said member wherein said seal comprises an inorganic insulation material of a yield stress and viscosity at the operating temperature that are sufficiently high to counteract leakage of the inorganic material through the opening as a consequence of its own weight and the pressure gradient and fitted between the line and the member which must be able to move relative to one another wherein at operation temperature the seal is constructed to additionally permit a movement in an axial direction with respect to the axial axis of the longitudinal member.

BRIEF DESCRIPTION OF THE DRAWINGS

The present invention can be more readily understood from the accompanying drawings, wherein:

FIG. 2 shows an enlarged detail view of the circled area in FIG. 1.

DETAILED DESCRIPTION OF THE PREFERRED EMBODIMENTS

In the seal according to the subject application there is always clearance between the pipe and the member permitting movement of the pipe relative to the member. Furthermore the pipe itself is surrounded by the sealing material while the sealing material is received in a chamber in the member. If such a seal is used in a fuel cell the individual pipes of such a fuel cell can freely slide with respect to one another during thermal expansion or contraction. This move is in the plans of the O-ring. In view of the fact that the glass is in a reservoir it is not surprising that the glass remains in its place. According to the present invention, however the glass is not in a reservoir and the parts move in an axial direction with respect to each other. In such circumstances it is highly surprising that the glass remains in its place.

An advantageous material for use as a seal is a tough silicate glass. More generally, suitable sealing materials are a highly viscous, tough alkali metal silicate glass and/or alkaline earth metal silicate glass and/or boron silicate glass and/or lead silicate glass and/or aluminium silicate glass and/or lithium silicate glass. Materials for which the viscosity is $5 \times 10^2$ to $5 \times 10^3$ kg m$^{-1}$ sec$^{-1}$ are preferred, in particular $(Na_2O)_{0.15} (CaO)_{0.10} (SiO_2)_{0.75}$ which has a viscosity of $10^3$ kg m$^{-1}$ sec$^{-1}$ at 1004° C.

$(Na_2O)_{0.30} (CaO)_{0.10} (SiO_2)_{0.70}$ which has a viscosity of $10^3$ kg m$^{-1}$ sec$^{-1}$ at 924° C.

$(Na_2O)_{2.20} (MgO)_{0.10} (SiO_2)_{0.70}$ which has a viscosity of $10^3$ kg m$^{-1}$ sec$^{-1}$ at 992° C.

$(Na_2O)_{0.20} (K_2O)_{0.30} (SiO_2)_{0.50}$ which has a viscosity of $10^3$ kg m$^{-2}$ sec$^{-1}$ at 1000° C.

$(K_2O)_{0.10} (PbO)_{0.10} (SiO_2)_{0.05}$ which has a viscosity of $10^3$ kg m$^{-1}$ sec$^{-1}$ at 1000° C.

As already expressed above it is surprising that, with the aid of a glass, a good seal is obtained which remains in place, does not flow away and is also able to withstand gas pressures without being blown out of place. It is, of course, necessary to use a suitable viscosity of the glass for this purpose.

Figure 1:
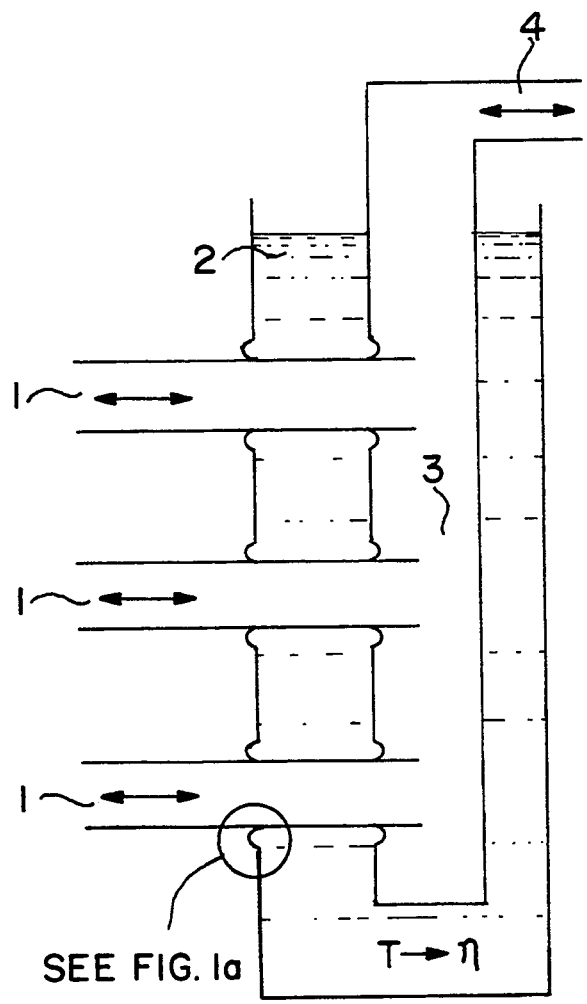
FIG. 1 shows a glass seal according to the present invention.
Figure 1A:
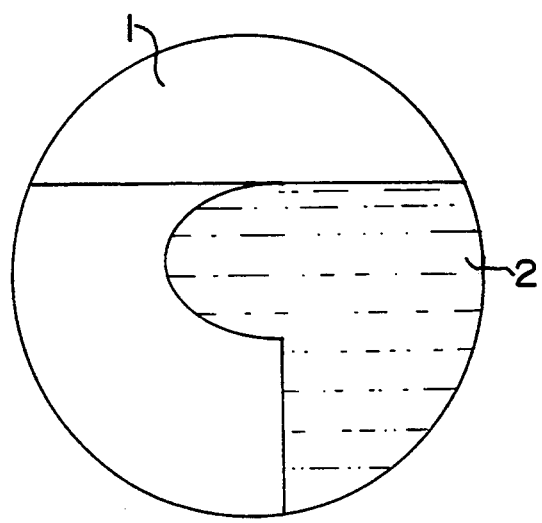

An example of a glass seal of this type is shown in FIG. 1. An enlarged detail is given in FIG. 1a. For a fuel cell, the gas pipes of the electrodes are passed through an insulating viscous mass 2 into a mixing/splitting chamber 3 and from there to channel 4. The yield stress and viscosity of the glass at the operating temperature should be as defined above. The diameters of the bores through which the pipes are passed are larger than the pipe diameter, in general by 1 or 2 mm, so that problems related to thermoexpansion are avoided here.

The viscosity can be controlled by means of the composition of the glass and the temperature of the glass.

The inorganic material used, in particular glass, must have a yield stress as high as possible. When selecting a glass and the components of the glass, a compromise must be sought between constituents of the glass. The glass can contain on the one hand lattice-forming agents (in order to obtain a sufficiently high yield stress) and, on the other hand, additives to lower the melting point. B and Pb have a substantial effect in lowering the melting point (breaking down the lattice). A melting point of 500° C. to 700° C. is possible. Calcium, sodium and potassium, and also magnesium, give a higher temperature of about 1000° C. in silicate glasses. In practice, an operating temperature of about 1000° C. is used in ceramic fuel cells.

The yield stress of a glass is influenced by the amount of lattice-forming material which is present in the glass. With regard to the viscosity, the processing point for glass industrially is about $10^3$ kg m$^{-1}$ sec$^{-1}$ because the glass otherwise becomes too tough and is difficult to process.

Provided the yield stress is not too greatly exceeded in an installation, this is generally not serious if a so-called manifold is used. As a result of the capillary action, which is obtained by taking spacings which are not too great between the parts which have to be able to move relative to one another, a capillary action is obtained which counteracts the loss of the tough material. It is also possible, for example in the case of fuel cells, to collect glass which has been lost from the seal at the bottom of the stack and subsequently to return this glass to the desired location. Small losses can therefore easily be offset.

Glasses having Bingham characteristics are known per se and are described, for example, in Handbook of Glass Data, Part C, Ternary Silicate Glasses, Elsevier, Amsterdam, 1987, in particular pages 27, 29-33 and 182 to 188. The yield strass and the associated phenomena are discussed in The Structure and Mechanical Properties of Inorganic Glasses by G. U. Bartenev, Wolters-Noordhoff Publishing, Groningen 1970, pages 141 to 146. A similar description is also given in Rheological Properties of Alkali Borate Glasses by Theodorus Johannes Maria Visser, a thesis published by the Technical University of Eindhoven (1971), pages 6-12, 40-72 and 78-82.

If desired, it is possible to raise the temperature of the glass during a heat cycle of the stack of fuel cells, by which means the pipes are to some extent able to move freely in the glass seal and as a result of which the glass can settle, by which means a gastight seal is obtained. When operating a cell stack, the glass temperature can, however, be lowered somewhat in order to prevent leakage of the glass seal.

An additional advantage of this type of gas tight seal is the possibility that the sealed elements are to some extent able to move freely relative to one another. Even the replacement of elements is easy. In such a case, the glass composition is removed from the holder at somewhat elevated temperature. The element is then removed from the stack and the pipes can be removed from the holder. A new element is placed in position and the glass composition is replaced in the holder at high temperature and the seal is restored.

We claim:

1. An article which comprises: a member with at least one opening therein; gas-carrying lines having an axial axis communicating with said member and being introduced into said opening; a seal fitted between said lines and member, wherein the seal comprises an inorganic insulation material of a yield stress and viscosity at the operating temperature that are sufficiently high to counteract leakage of the inorganic material through the opening as a consequence of its own weight and the pressure gradient, wherein said line and member are able to move relative to one another, and wherein at operating temperature the seal is constructed to permit movement between said line and member in an axial direction.

2. An article according to claim 1 wherein the inorganic material used is a material which has Bingham flow characteristics.

3. An article according to claim 2 wherein the inorganic material is glass.

4. An article according to claim 3 wherein the glass is silicate glass.

5. An article according to claim 4 wherein the silicate glass is selected from the group consisting of alkali metal silicate glass, alkaline earth metal silicate glass, boron silicate glass, lead silicate glass, aluminum silicate glass, and lithium silicate glass.

6. An article according to claim 5 wherein the viscosity of said silicate glass at 1000° C. is $5 \times 10^2$ to $5 \times 10^3$ Kg.m$^{-1}$.sec.$^{-1}$.

7. An article according to claim 6 wherein the glass is selected from the group consisting of $(Na_2O)_{0.15} (CaO)_{0.10} (SiO_2)_{0.75}$ which has a viscosity of $10^3$ kg m$^{-1}$ sec$^{-1}$ at 1004° C.;

$(Na_2O)_{0.20} (CaO)_{0.10} (SiO_2)_{0.70}$ which has a viscosity of $10^3$ kg m$^{-1}$ sec$^{-1}$ at 924° C.;

$(Na_2O)_{0.20} (MgO)_{0.10} (SiO_2)_{0.70}$ which has a viscosity of $10^3$ kg m$^{-1}$ sec$^{-1}$ at 992° C.;

$(Na_2O)_{0.20} (K_2O)_{0.30} (SiO_2)_{0.50}$ which has a viscosity of $10^3$ kg m$^{-1}$ sec$^{-1}$ at 1000° C.;

$(K_2O)_{0.10} (PbO)_{0.10} (SiO_2)_{0.80}$ which has a viscosity of $10^3$ kg m$^{-1}$ sec$^{-1}$ at 1000° C.

8. An article according to claim 7 including a gas carrying line which incorporates said seal.

9. An article according to claim 7 incorporated in a cell selected from the group consisting of an electrochemical cell and a fuel cell, wherein said lines can freely slide with respect to each other during thermal expansion and contraction.

* * * * *